No. 716,566. Patented Dec. 23, 1902.
H. C. MEEKER.
CHURN.
(Application filed May 19, 1902.)
(No Model.)
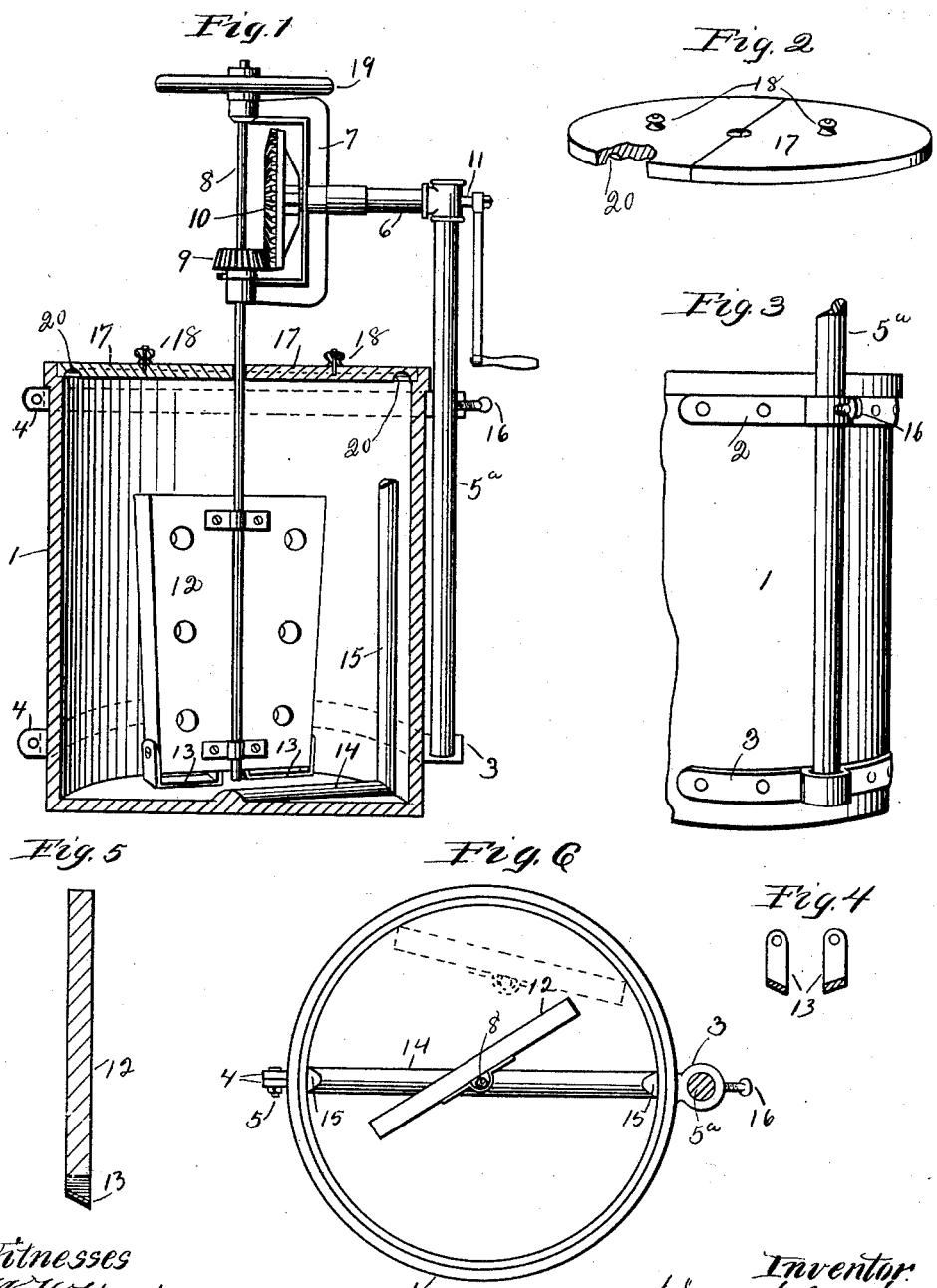
Witnesses
W. H. Stough
E. Ale Smith
Inventor
Henry C. Meeker
By F. W. Bond
Atty.

UNITED STATES PATENT OFFICE.

HENRY C. MEEKER, OF DESHLER, OHIO.

CHURN.

SPECIFICATION forming part of Letters Patent No. 716,566, dated December 23, 1902.

Application filed May 19, 1902. Serial No. 107,948. (No model.)

*To all whom it may concern:*

Be it known that I, HENRY C. MEEKER, a citizen of the United States, residing at Deshler, in the county of Henry and State of Ohio, have invented certain new and useful Improvements in Churns; and I do hereby declare that the following is a full, clear, and exact description of the same, reference being had to the annexed drawings, making a part of this specification, and to the figures of reference marked thereon, in which—

Figure 1 is a vertical section. Fig. 2 is a view of the cover. Fig. 3 is a view showing a portion of the churn-body, also the dasher and gear support. Fig. 4 is a view showing a transverse section of the dasher-blades and one of their angled ends. Fig. 5 is a view showing the lower end of the dasher and the position of one of the dasher-blades. Fig. 6 is a top view of the churn-body, showing the dasher-shaft and the dasher moved to one side of the vertical center in dotted lines.

The present invention has relation to churns; and it consists in the novel arrangement hereinafter described, and particularly pointed out in the claims.

Similar numerals of reference indicate corresponding parts in all the figures of the drawings.

In the accompanying drawings, 1 represents the churn-body, which is preferably circular in cross-section and formed of a size to correspond with the size of the churn designed to be constructed.

To the churn-body 1 are attached in any convenient and well-known manner eyebars 2 and 3, which eyebars may be formed of such a length that they can be connected together upon the opposite side of the churn-body from that of the eyes by means of flanges 4 and bolts or rivets 5, or, if desired, the eyebars may be formed of shorter lengths and connected to the churn-body in any convenient and well-known manner. It will be understood that the only object and purpose of providing the eyebars 2 and 3 is to provide a means for supporting and holding in an upright position the dasher and gear support $5^a$, which dasher and gear support is extended above the top of the churn-body any desired distance and its top or upper end provided with the angled arm 6, to which angled arm is attached or formed integral therewith the head 7, which head is formed of such a shape that suitable bearings are provided for the dasher-shaft 8, which dasher-shaft is provided with the pinion 9, said pinion meshing with the gear-wheel 10, which gear-wheel is securely attached to the crank-shaft 11. Said crank-shaft is properly journaled in the upper end of the support $5^a$ and the head 7.

To the dasher-shaft 8 is attached the dasher 12, which dasher may be and preferably is of the form shown in the drawings and is so connected to the shaft 8 that it will rotate with the dasher-shaft. The bottom or lower end of the dasher 12 is provided with the dasher-blades 13, which dasher-blades extend a short distance below the bottom end of the dasher and are angled in opposite directions, so that the cream will be better agitated by the rotation of the dasher and the dasher-blades. For the purpose of preventing the cream from following the rotation of the dasher without proper agitation the bottom of the churn-body 1 is provided with the ridge 14, which ridge extends diametrically across the bottom of the body, and upon opposite sides of the body are located the ribs 15, which ribs may extend to the top of the body or near the top thereof and are also for the purpose of breaking the circulation of the cream or, in other words, are for the purpose of providing better agitation.

The dasher and gear support $5^a$ is rotatably connected to the eyebars 2 and 3 and held against rotation or rocking movement by means of the set-screw 16; but when it is desired to move the dasher-shaft 8, together with the dasher, to one side of the center, as illustrated in Fig. 6, the dasher and gear support $5^a$ is released, at which time the head 7, together with the different parts connected thereto, is free to be moved through the arc of a circle of which the dasher and gear support is the center. It will, however, be understood that this is the only way it can be accomplished when the cover 17 is removed, said cover being formed in halves, so that when the cover proper can be removed and when the cover 17 is so removed the dasher-shaft, together with the dasher and its blades, can be brought out of the way without removing from the churn, so as to provide room to easily remove the butter, this being desirable in many instances. For the purpose of providing means for easily removing the cover 17 the knobs 18 are provided and are attached in any convenient and well-known manner.

For the purpose of adding momentum the balance-wheel 19 is provided, which balance-wheel is securely attached to the top or upper end of the dasher-shaft 8.

It will be understood that by my peculiar arrangement the dasher-shaft 8 is not supported at its bottom or lower end, but is held in proper position vertically by means of the support $5^a$.

For the purpose of preventing the contents of the churn-body 1 from splashing out between the cover and the top of the receptacle the bottom or under side of the cover-sections 17 is provided with the groove 20, which groove may be extended over a portion of the ledge or it may be located just at the inner edge, as desired. It will be understood that when the contents splash up against the bottom or under side of the cover the groove will turn the same back into the receptacle. It will be understood that the groove 20 is to be located near the periphery of the cover.

Having fully described my invention, what I claim as new, and desire to secure by Letters Patent, is—

1. In a churn of the class described, the combination of a churn-body, bars provided with eyes secured thereto, a dasher and gear support rotatably mounted in the eyes of the eyebars, a dasher-shaft provided with a dasher, and the dasher provided at its bottom or lower end with dasher-blades, angled in opposite directions, means for rotating the dasher, and ribs located across the bottom and inner faces of the churn-body, substantially as and for the purpose specified.

2. The combination of a churn-body, eyebars connected thereto, a cover provided with a groove upon its bottom or under side, near its periphery, a dasher and gear support rotatably connected to the eyebars, means for holding the dasher-support against rotation, a dasher-shaft provided at its upper end with a balance-wheel, a dasher secured to the dasher-shaft, blades extended beyond the bottom or lower end of the dasher and angled in opposite directions, and means for imparting a rotary motion to the dasher, substantially as and for the purpose specified.

In testimony that I claim the above I have hereunto subscribed my name in the presence of two witnesses.

HENRY C. MEEKER.

Witnesses:
F. A. MEEKER,
J. BRUCE GRIBBELL.